United States Patent
Cahill et al.

(10) Patent No.: US 8,296,267 B2
(45) Date of Patent: Oct. 23, 2012

(54) UPGRADE OF HIGHLY AVAILABLE FARM SERVER GROUPS

(75) Inventors: Jason M. Cahill, Woodinville, WA (US); Alexander Hopmann, Seattle, WA (US); Eric Fox, Seattle, WA (US); Zach Rosenfield, Seattle, WA (US); Marc Keith Windle, Woodinville, WA (US); Erick Raymundo Lerma, Bothell, WA (US); Ricardo Prates de Oliveira, Bellevue, WA (US); Doron Bar-Caspi, Redmond, WA (US); Kshamta Jerath, Bothell, WA (US); Arshish Kapadia, Issaquah, WA (US); Tarkan Sevilmis, Redmond, WA (US); Tittu Jose, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 14 days.

(21) Appl. No.: 12/908,752

(22) Filed: Oct. 20, 2010

(65) Prior Publication Data
US 2012/0101998 A1    Apr. 26, 2012

(51) Int. Cl.
*G06F 17/30* (2006.01)
(52) U.S. Cl. ........................................ 707/661
(58) Field of Classification Search .............. 707/2, 661; 709/223, 661
See application file for complete search history.

(56) References Cited

U.S. PATENT DOCUMENTS

| | | | |
|---|---|---|---|
| 5,553,215 A | 9/1996 | Kaethler | 715/219 |
| 5,835,910 A | 11/1998 | Kavanagh et al. | 1/1 |
| 5,913,032 A | 6/1999 | Schwartz et al. | 709/213 |
| 6,212,382 B1 | 4/2001 | Watson et al. | 455/444 |
| 6,571,283 B1 | 5/2003 | Smorodinsky | 709/220 |
| 6,578,054 B1 | 6/2003 | Hopmann et al. | 707/625 |
| 6,675,226 B1 | 1/2004 | Nair et al. | |
| 6,711,593 B1 | 3/2004 | Gordon et al. | 707/615 |
| 6,823,384 B1 | 11/2004 | Wilson et al. | 709/225 |
| 6,898,727 B1 | 5/2005 | Wang et al. | |
| 6,983,311 B1 | 1/2006 | Haitsuka et al. | |
| 6,988,241 B1 | 1/2006 | Guttman et al. | |
| 7,000,228 B2 | 2/2006 | Mortazavi | 717/168 |
| 7,325,156 B1 | 1/2008 | Schloss et al. | |
| 7,360,208 B2 | 4/2008 | Joshi et al. | 717/168 |

(Continued)

FOREIGN PATENT DOCUMENTS

KR    10-0980599    9/2010
(Continued)

OTHER PUBLICATIONS

U.S. Appl. No. 12/908,681, filed Oct. 20, 2010 entitled "Placing Objects on Hosts Using Hard and Soft Constraints".

(Continued)

*Primary Examiner* — Etienne Leroux
(74) *Attorney, Agent, or Firm* — Merchant & Gould

(57) ABSTRACT

A machine manager controls the deployment and management of machines (physical and virtual) for an online service. Multi-tier server groups are arranged in farms that each may include different configurations. For example, their may be content farms, federated services farms and SQL farms that are arranged to perform operations for the online service. When the multiple farms are upgraded, new farms are deployed and the associated content databases from the old farms are moved to the newly deployed farms. During the upgrade of the farms, requests may continue to be processed by the farms. The farms may be automatically load balanced during an upgrade. As content becomes available on the new farm, requests for the content may be automatically redirected to the new farm.

20 Claims, 10 Drawing Sheets

U.S. PATENT DOCUMENTS

| | | | |
|---|---|---|---|
| 7,454,659 B1 | 11/2008 | Gaudette et al. | |
| 7,555,751 B1 | 6/2009 | Abbavaram et al. | 717/168 |
| 7,577,661 B2 | 8/2009 | Bankston et al. | 1/1 |
| 7,668,961 B2 | 2/2010 | Lomet | 709/230 |
| 7,680,848 B2 | 3/2010 | Janeditakarn | |
| 7,680,933 B2 | 3/2010 | Fatula, Jr. | 709/226 |
| 7,720,820 B2 | 5/2010 | Lomet | 707/682 |
| 2001/0056554 A1 | 12/2001 | Chrabaszcz | 714/13 |
| 2002/0078233 A1 | 6/2002 | Biliris et al. | 709/238 |
| 2002/0162049 A1 | 10/2002 | Takamoto et al. | |
| 2003/0005133 A1 | 1/2003 | Banerjee et al. | |
| 2003/0061365 A1 | 3/2003 | White et al. | 709/229 |
| 2003/0193558 A1 | 10/2003 | Doss et al. | 348/14.01 |
| 2003/0204460 A1 | 10/2003 | Robinson et al. | |
| 2004/0133619 A1 | 7/2004 | Zelig et al. | 709/200 |
| 2004/0143662 A1* | 7/2004 | Poyhonen et al. | 709/225 |
| 2004/0210623 A1 | 10/2004 | Hydrie et al. | 709/223 |
| 2005/0050076 A1 | 3/2005 | Tong et al. | 707/100 |
| 2006/0015932 A1 | 1/2006 | Ballinger et al. | 726/9 |
| 2006/0031268 A1 | 2/2006 | Shutt et al. | |
| 2006/0075076 A1 | 4/2006 | Sinha | |
| 2006/0085785 A1 | 4/2006 | Garrett | 718/1 |
| 2006/0123119 A1 | 6/2006 | Hill et al. | 709/227 |
| 2006/0168218 A1 | 7/2006 | Kashyap | 709/225 |
| 2006/0190698 A1 | 8/2006 | Mizuno et al. | 711/170 |
| 2006/0271395 A1 | 11/2006 | Harris et al. | 718/1 |
| 2006/0277224 A1 | 12/2006 | Aftab et al. | 707/201 |
| 2007/0005769 A1 | 1/2007 | Ammerlann et al. | 709/226 |
| 2007/0050415 A1 | 3/2007 | Armangau et al. | 707/200 |
| 2007/0086476 A1 | 4/2007 | Iglesias et al. | |
| 2007/0130566 A1 | 6/2007 | van Rietschote et al. | 718/1 |
| 2007/0198554 A1 | 8/2007 | Liu | 1/1 |
| 2007/0219956 A1 | 9/2007 | Milton | 1/1 |
| 2007/0220415 A1 | 9/2007 | Cheng et al. | |
| 2007/0260644 A1 | 11/2007 | Ljungqvist et al. | |
| 2007/0261049 A1 | 11/2007 | Bankston et al. | 717/170 |
| 2007/0271560 A1 | 11/2007 | Wahlert et al. | |
| 2008/0077632 A1 | 3/2008 | Tysowski et al. | |
| 2008/0082560 A1 | 4/2008 | Agrawal et al. | 707/101 |
| 2008/0098046 A1 | 4/2008 | Alpern et al. | 1/1 |
| 2008/0147753 A1 | 6/2008 | Chasman et al. | 1/1 |
| 2008/0154918 A1 | 6/2008 | Iwatsu et al. | |
| 2008/0155023 A1 | 6/2008 | Kadashevich | |
| 2008/0189468 A1 | 8/2008 | Schmidt et al. | 711/6 |
| 2008/0243867 A1 | 10/2008 | Janedittakarn et al. | 1/1 |
| 2008/0244184 A1 | 10/2008 | Lewis et al. | 711/130 |
| 2008/0270459 A1 | 10/2008 | Grewal et al. | 1/1 |
| 2008/0270564 A1 | 10/2008 | Rangegowda et al. | 709/212 |
| 2009/0083561 A1 | 3/2009 | Kaburlasos et al. | 713/323 |
| 2009/0164621 A1 | 6/2009 | Kothari et al. | 709/224 |
| 2009/0216789 A1 | 8/2009 | Chowdharty et al. | 707/101 |
| 2009/0216855 A1 | 8/2009 | Lang et al. | |
| 2009/0228950 A1 | 9/2009 | Reed et al. | 726/1 |
| 2009/0248756 A1 | 10/2009 | Akidau et al. | |
| 2009/0293022 A1 | 11/2009 | Fries | 716/132 |
| 2009/0327139 A1 | 12/2009 | Shah et al. | 705/71 |
| 2010/0011409 A1 | 1/2010 | Hodgkinson et al. | 726/1 |
| 2010/0070466 A1 | 3/2010 | Prahlad et al. | |
| 2010/0095198 A1 | 4/2010 | Bultrowicz et al. | |
| 2010/0106812 A1 | 4/2010 | Bernabeu-Auban et al. | 709/221 |
| 2010/0113159 A1 | 5/2010 | Chapman et al. | |
| 2010/0121902 A1 | 5/2010 | Chandrasekhar et al. | |
| 2010/0125612 A1 | 5/2010 | Amradkar et al. | 707/802 |
| 2010/0146290 A1 | 6/2010 | Bachmann et al. | 713/185 |
| 2010/0162226 A1 | 6/2010 | Borissov | 717/173 |
| 2010/0192143 A1 | 7/2010 | Ingle et al. | 717/172 |
| 2010/0205227 A1 | 8/2010 | Weissman et al. | |
| 2010/0211548 A1 | 8/2010 | Ott et al. | 707/655 |
| 2010/0211619 A1 | 8/2010 | Weissman et al. | |
| 2010/0251339 A1 | 9/2010 | McAlister | |
| 2010/0262632 A1 | 10/2010 | Jain | |
| 2010/0275222 A1 | 10/2010 | Wallace | |
| 2010/0287359 A1 | 11/2010 | Norden | 712/210 |
| 2012/0101983 A1 | 4/2012 | Hopmann et al. | |
| 2012/0102067 A1 | 4/2012 | Cahill et al. | |
| 2012/0102198 A1 | 4/2012 | Cahill et al. | |
| 2012/0102199 A1 | 4/2012 | Hopmann et al. | |
| 2012/0102480 A1 | 4/2012 | Hopmann et al. | |
| 2012/0102494 A1 | 4/2012 | Cahill et al. | |
| 2012/0102506 A1 | 4/2012 | Hopmann et al. | |
| 2012/0131660 A1 | 5/2012 | Dalzell et al. | |
| 2012/0151378 A1 | 6/2012 | Parish et al. | |

FOREIGN PATENT DOCUMENTS

| | | |
|---|---|---|
| WO | 2010-090899 | 8/2010 |

OTHER PUBLICATIONS

U.S. Appl. No. 12/908,639, filed Oct. 20, 2010 entitled "Dynamically Splitting Multi-Tenant Databases".

U.S. Appl. No. 12/908,623, filed Oct. 20, 2010 entitled "High Availability of Machines During Patching".

U.S. Appl. No. 12/908,653, filed Oct. 20, 2010 entitled "Web Service Patterns for Globally Distributed Service Fabric".

U.S. Appl. No. 12/908,590, filed Oct. 20, 2010 entitled "Machine Manager Service Fabric".

U.S. Appl. No. 12/908,703, filed Oct. 20, 2010 entitled "Online Database Availability During Upgrade".

U.S. Appl. No. 12/908,694, filed Oct. 20, 2010 entitled "Managing Networks and Machines for an Online Service".

U.S. Appl. No. 12/953,379, filed Nov. 23, 2010 entitled "Using Cached Security Tokens in an Online Service".

U.S. Appl. No. 12/964,633, filed Dec. 9, 2010 entitled "Codeless Sharing of Spreadsheet Objects".

Above the Cloud; "The Azure Fabric Controller"; Published Mar. 23, 2009; http://azure.snagy.name/blog/?p=89; 3 pgs.

"Adopting Server Virtualization for Business Continuity and Disaster Recovery"; CA ARCserve Backup and CA Xosoft Replication and High Availability Software with Hyper-V Technology—A Powerful Combination; Published 2009; 17 pgs.

Allamaraju; "Idempotency Explained"; Published Feb. 21, 2008; 5 pgs.

"BadBlue Excel Web Spreadsheet Collaboration Server 2.72b"; Published Apr. 20, 2010; http://badblue-excel-web-spreadsheet-collaboration-server.badblue.qarchive.org/; 2 pgs.

Chaisiri et al., "Optimal Virtual Machine Placement across Multiple Cloud Providers"; School of Computer Engineering, Nanyang Technological University, Singapore; 2009 IEEE; 8 pgs.

Chronic db; "Live Database Schema Updates—Zero Downtime"; Retrieved Sep. 20, 2010; http://chronicdb.com/benefits_of_chronicdb; 3 pgs.

Crets; "Idempotent Services"; Blog of Guy Crets; Jul. 9, 2008; 1 pg.

Das et al., "ElasTraS: An Elastic, Scalable, and Self Managing Transactional Database for the Cloud"; Department of Computer Science, University of California, Santa Barbara, CA; UCSB Computer Science Technical Report Apr. 2010; 14 pgs.

"Excel Services Overview (SharePoint Server 2010)"; Microsoft Corporation; Published May 12, 2010; http://technet.microsoft.com/en-us/library/ee424405.aspx; 3 pgs.

Exortech; "Zero-Downtime Database Deployment"; Published Feb. 1, 2009; http://exortech.com/blog/2009/02/01weekly-release-blog-11-zero-downtime-database-deployment; 3 pgs.

Forster et al.; "Using SAML Security Tokens with Microsoft Web Services Enhancements"; Published Apr. 29, 2008; http://www.ibm.com/ developerworks/tivoli/library/t-samlwse/index.html; 23 pgs.

"HP Serviceguard Cluster Configuration for HP-UX 11i or Linux Partitioned Systems"; Apr. 2009; 13 pgs.

Hyser et al., "Autonomic Virtual Machine Placement in the Data Center"; HP Laboratories; Feb. 26, 2008; 11 pgs.

"IBM Director v6.2.x"; Retrieved Sep. 20, 2010; http://publib.boulder.ibm.com/infocenter/director/v6r2x/index.jsp?topic=/com.ibm.director.updates.helps.doc/fqm0_t_um_updating_systems.html; 2 pgs.

KaChing Engineering; "No Downtime Database Schema Changes"; Published Aug. 15, 2010; http://eng.kaching.com/2010/08/no-downtime-database-schema-changes.html; 4 pgs.

Kim, "Virtual Machine Placement Optimization"; Carnegie Mellon Engineering, Carnegie Institute of Technology; Retrieved Date—Aug. 26, 2010; 2 pgs.

Kumar; "Sharing and Previewing Google Docs in Socialwok: Google Data SPI"; Published Apr. 9, 2010; http://googleappsdeveloper.blogspot.com/2010/04/ sharing-and-previewing-google-docs-in.html; 6 pgs.
"LinkedCells 1.8 Description"; WareSeeker.com; Published Mar. 16, 2009; http://wareseeker.com/Business-Finance/linkedcells-1.8.zip/1f2ea4b9e; 3 pgs.
"Microsoft High Availability Overview White Paper"; Published Jan. 2008; 19 pgs.
Microsoft; "Virtual Machine Manager"; Retrieved Sep. 21, 2010; http://www.microsoft.com/systemcenter/en/us/virtual-machine-manager.aspx; 2 pgs.
Microsoft Corporation; "Scaling Out SQL Server 2005"; Published Date: Apr. 2006; http://msdn.microsoft.com/en-us/library/aa479364.aspx; 15 pgs.
Microsoft Corporation; "Messaging Patterns in Service-Oriented Architecture, Part 1"; Published Apr. 2004; 10 pgs.
Microsoft TechNet; "Placing Virtual Machines on Hosts"; 2010 Microsoft Corporation; 3 pgs.
Microsoft TechNet; "Configure a Server Farm for Minimal Downtime During Software Updates (Office SharePoint Server 2007)"; Published Sep. 17, 2009; http://technet.microsoft.com/en-us/library/ee514459(office.12).aspx; 26 pgs.
Microsoft TechNet; "Configure Claims-Based Authentication Using Windows Live ID (SharePoint Server 2010)"; Published Sep. 9, 2010; http://technet.microsoft.com/en-us/library/ff973117(printer).aspx; 17 pgs.
MSDN Magazine; "Designing Services for Windows Azure"; Published Jan. 2010; 11 pgs.
"MySQL Cluster Features"; Retrieved Sep. 20, 2010; http://www.mysql.corn/products/database/cluster/features.html; 5 pgs.
"The NorduGrid Grid Manager and GridFTP Server"; Published Aug. 10, 2010; http://www.nordugrid.org/documents/GM-pdf; 37 pgs.
Oracle9i Database Migration; "Compatibility and Interoperability"; Retrieved Sep. 20, 2010; http://download.oracle.com/docs/cd/A97630_01/server.920/a96530/migcompa.htm; 42 pgs.
Ranganathan; "Idempotency in Services"; Published Dec. 1, 2009; 21 pgs.
"RightGrid Basic Example"; Retrieved Sep. 24, 2010; http://support.rightscale.com/03-Tutorials/02-AWS/03-Grid_Edition/Basic_RightGrid_Example; 16 pgs.
"SAS Grid Computing"; SAS Institute; Retrieved Sep. 24, 2010; http://www.sas.com/technologies/architecture/grid/index.html; 2 pgs.
"Small to Medium Sized Data Center with Applogic Cloud"; Migrate to Cloud; Published Jul. 22, 2010; http://www.migrate2cloud.com/blog/small-to-medium-sized-date-center-with-applogic-cloud; 4 pgs.
Tarighi et al., "A New Model for Virtual Machine Migration in Virtualized Cluster Server Based on Fuzzy Decision Making"; Journal of Telecommunications, vol. 1, Issue 1, Feb. 2010; 12 pgs.

"Understanding SharePoint 2010 Claims Authentication"; Published May 27, 2010; http://blogs.msdn.com/b/russmax/archive/2010/05/27/ understanding-sharepoint-2010-claims-authentication.aspx; 5 pgs.
"Using Vmware vCenter Update Manager to Keep your vSphere Hosts Up-to-Date with Patching"; Published Feb. 9, 2010; http://www.simple-talk.com/sysadmin/virtualization/using-vmware-vcenter-update-manager-to-keep-your-vsphere-hosts-up-to-date-with-patching/; 10 pgs.
Vmware; "Automating High Availability (HA) Services with Vmware HA"; Copyright 1998-2006; 15 pgs.
Vmware vSphere; "Vmware vCenter Update Manager"; Retrieved Sep. 14, 2010; 2 pgs.
"Vmware Virtual Appliances"; Published Jan. 8, 2009; http://www.petri.co.il/virtual_vmware_virtual_appliances.htm; 2 pgs.
Wang et al., "A Study and Performance Evaluation of the Multi-Tenant Data Tier Design Patterns for Service Oriented Computing"; IBM China Research Lab, Beijing, China; IEEE Computer Society, 2008 IEEE; 8 pgs.
"XLCubed Web Edition"; Published 2009; http://xlcubed.com/en/web.html; 2 pgs.
"Zones Parallel Patching Feature Now Available"; Published Date Jun. 17, 2009; 1 pg.
Meng et al., "Improving the Scalability of Data Center Networks with Traffic-aware Virtual Machine Placement"; IBM T. J. Watson Research Center; Published May 6, 2010; 9 pgs.
International Search Report dated Mar. 6, 2012 cited in Appln No. PCT/US2011/054566.
International Search Report dated Mar. 6, 2012 cited in Appln No. PCT/US2011/055412.
International Search Report dated Mar. 26, 2012 cited in Appln No. PCT/US2011/053296.
International Search Report dated Apr. 25, 2012 cited in Appln No. PCT/US2011/054516.
U.S. Office Action dated Apr. 16, 2012 cited in U.S. Appl. No. 12/908,639.
U.S. Office Action dated Apr. 27, 2012 cited in U.S. Appl. No. 12/908,703.
International Search Report dated May 1, 2012 cited in Appln No. PCT/US2011/052175.
International Search Report dated May 3, 2012 cited in Appln No. PCT/US2011/053370.
International Search Report dated May 4, 2012 cited in Appln No. PCT/US2011/056594.
International Search Report dated May 17, 2012 cited in Appln No. PCT/US2011/054642.
International Search Report dated Jun. 15, 2012 cited in Appln No. PCT/US2011/062170.

* cited by examiner

UPGRADE OF HIGHLY AVAILABLE FARM SERVER GROUPS

BACKGROUND

Online services include files that are located on web servers along with data that is stored in databases. For example, there may be a large number of servers located within different networks to handle the traffic that is directed to the online service. Managing and deploying the large number of servers that are arranged in different farms is a time consuming process that requires a large operations staff that is subject to human error.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A machine manager controls the deployment and management of machines (physical and virtual) for an online service. Multi-tier server groups are arranged in farms that each may include different configurations. For example, there may be content farms, federated services farms and SQL farms that are arranged to perform operations for the online service. When the multiple farms are upgraded, new farms are deployed and the associated content databases from the old farms are moved to the newly deployed farms. During the upgrade of the farms, requests may continue to be processed by the farms. The farms may be automatically load balanced during an upgrade. As content becomes available on the new farm, requests for the content may be automatically redirected to the new farm.

DETAILED DESCRIPTION

Figure 1:
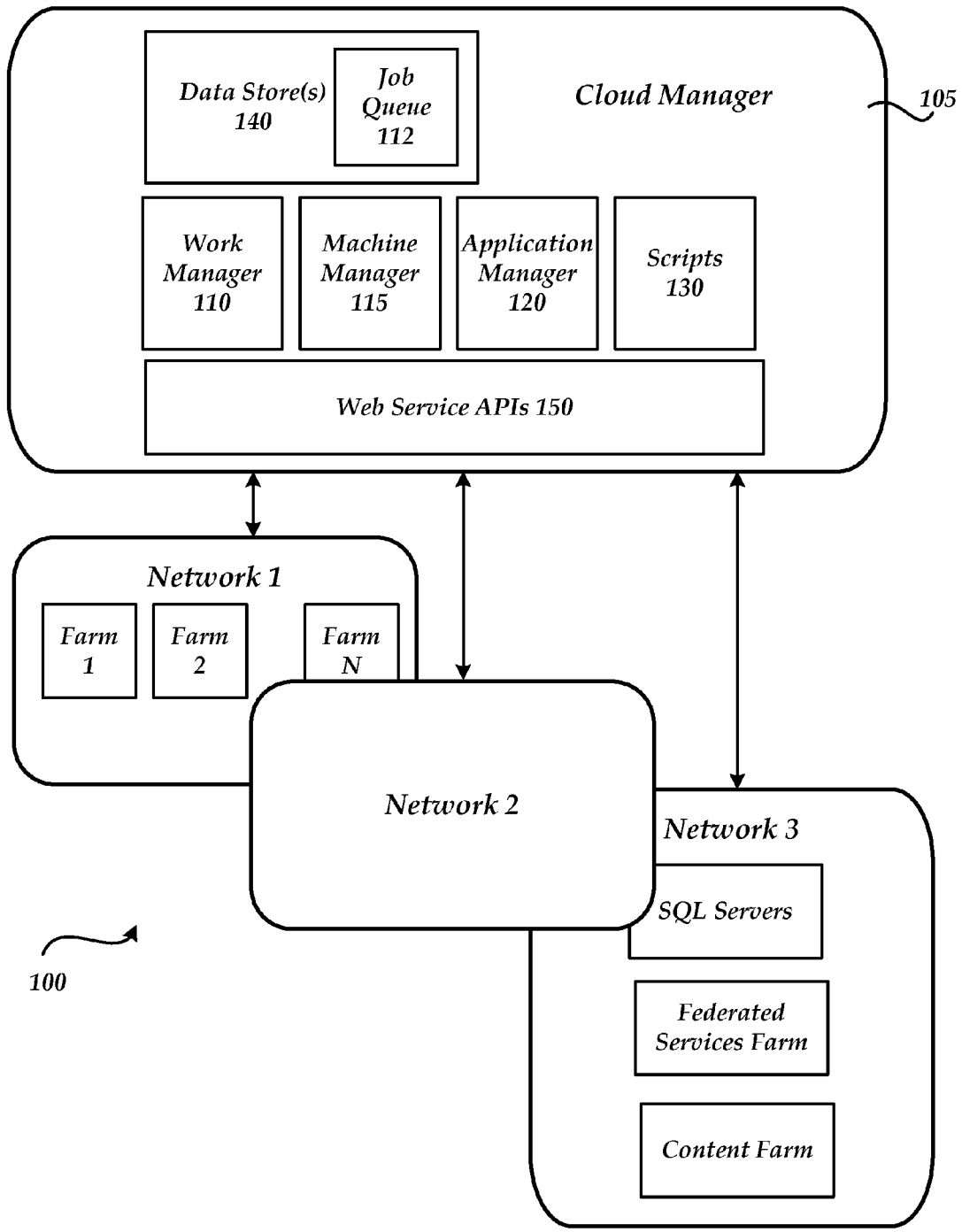
FIG. 1 illustrates a cloud manager system for managing networks that are associated with an online service, such as a content management service.

Referring now to the drawings, in which like numerals represent like elements, various embodiment will be described.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

FIG. 1 illustrates a cloud management system for managing networks that are associated with an online service. System 100 illustrates cloud manager 105 that is connected to and manages different networks potentially distributed across the world. Each of the networks is configured to provide content services for one or more tenants (e.g. clients, customers). The networks may be hosted within a cloud service and/or in an on-premises data center. Cloud manager 105 is used in deploying, configuring and managing the networks. The cloud manager is configured to receive requests through an idempotent and asynchronous application web service application programming interface (API) 150 that can tolerate intermittent network failures.

As illustrated, cloud manager 105 comprises work manager 110, machine manager 115, application specific manager 120, scripts 130 and a central repository, such as data store(s) 140 (e.g. databases). The functionality that is not included within one of the illustrated managers may reside in some other location of the cloud manager. According to one embodiment, application manager 120 is a SharePoint tenant manager that comprises SharePoint specific logic.

Work manager 110 manages the execution of tasks and enables scheduling and retry of longer running tasks. Work manager 110 starts jobs stored in job queue 112 and keeps track of running jobs. When a predetermined time has elapsed, work manager 110 may automatically cancel the task and perform some further processing relating to the task. According to one embodiment, the tasks in job queue 112 are executed by work manager 110 by invoking one or more scripts 130. For example, a scripting language such as Microsoft's PowerShell® may be used to program the tasks that are executed by work manager 110. Each script may be run as a new process. While executing each script as a new process may have a fairly high CPU overhead, this system is scalable and helps to ensure a clean environment for each script execution plus full cleanup when the script is completed.

Machine manager 115 is configured to manage the physical machines in the networks (e.g. Network 1, Network 2, Network 3). Generally, machine manager 115 understands Networks, Physical Machines, Virtual Machines (VMs), VM Images (VHDs), and the like. The machine manager does not have a strong binding to the specific services running within the networks but keeps track of the various components in the networks in terms of "roles." For example machine manager 115 could be requested through API 150 to deploy a VM of type "Foo" with version 12.34.56.78 on Network 3. In response to a request to cloud manager 105, machine manager 115 locates a suitable Physical Machine that is located on Network 3 and configures the VM according to the VM Image associated with the VM's Role. The physical machine is configured with a VHD of type Foo with version 12.34.56.78 that is stored within a data store, such as data store 140. The images used within the network may also be stored in other locations, such as a local data share for one or more of the networks. Scripts may be run to perform the installation of the VHD on the physical machine as well as for performing any post-deployment configuration. Machine manager 115 keeps track of the configuration of the machines each network. For example, machine manager 115 may keep track of a VM's role (type of VM), state of the VM (Provisioning, Running, Stopped, Failed), version and whether the VM exists in a given farm (which implies their network).

Scripts 130 is configured to store scripts that are executed to perform work both locally for cloud manager 105 and remotely on one or more of the networks. One or more of the scripts 130 may also be stored in other locations. For example, scripts to be performed on a network (e.g. Network 1, Network 2, Network 3) may be stored locally to that network. The scripts may be used for many different purposes. For example, the scripts may be used to perform configurations of machines in one or more of the networks, changing settings on previously configured machines, add a new VM, add a new database, move data from one machine to another, move tenants, change schemas, and the like. According to one embodiment, the scripts are Microsoft's PowerShell® scripts. Other programming implementations may be used. For example, a compiled and/or early-bound programming language may be used to implement the functionality. Scripting, however, is a fairly concise language to express many of the tasks that are to be performed. Programming the equivalent in a programming language, such as C#, would often require much more verbose implementations. The scripts are also late-bound, meaning that multiple versions of underlying code-bases can be targeted without having to constantly link to different interface DLLs. Using PowerShell scripts allows a process to be started locally by cloud manager 105 that may in turn start a process on a remote machine (i.e. a physical machine in one of the attached networks). Other techniques may also be used to start a process on a remote machine, such as Secure Shell (SSH) and the like.

Application specific information that cloud manager 105 is managing is performed by application manager 120. According to one embodiment, the application specific information relates to Microsoft SharePoint®. As such, application manager 120 is configured to know about SharePoint Tenants, Site Collections, and the like.

Each network may be configured as a dedicated network for a tenant and/or as a multi-tenant network that services more than one client. The networks may include a changing number of physical/virtual machines with their configuration also changing after deployment. Generally, a network may continue to grow as long as the networking limits (e.g. load balancer and network switches) are not exceeded. For example, a network may start out with ten servers and later expand to one hundred or more servers. The physical machines within a network may be assigned a class or type. For example, some of the machines may be compute machines (used for web front ends and app servers) and other machines may be storage machines that are provisioned with more storage than compute machines. According to an embodiment, cloud manager 105 configures the machines within a network with multiple versions of the image files. According to an embodiment, farms usually have a same version of image files.

According to one embodiment, the software limits are managed by the cloud manager system 100 within the network by virtualizing the machines and managing independently acting "Farms" inside the network. Each network may include one or more farms (e.g. see Network 1). According to one embodiment, a network is considered a single cluster of network load balanced machines that expose one or more VIP (Virtual IP) to the outside world and can route that traffic to any of the machines within the network. The machines in the network generally are tightly coupled and have minimum latencies (i.e. <1 ms ping latency).

Farms are the basic grouping of machines used to coordinate applications that need tightly bound relationships. For example, content farms may be deployed within each of the networks for a content management application, such as Microsoft SharePoint®. Generally, the set of machines in each of the farms provide web service and application server functions together. Typically, the machines inside the farm are running the same build of an application (i.e. SharePoint) and are sharing a common configuration database to serve specific tenants and site collections.

Farms can contain heterogeneous sets of virtual machines. Cloud manager 105 maintains a "farm goal" within data store 140 which is a target number of machines of each role for each farm. Some roles include Content Front End, Content Central Admin, Content Timer Service, Federated Central Admin, Federated App Server etc. For example, content farms are the basic SharePoint farm that handles incoming customer requests. Federated Services farms contain SharePoint services that can operate cross farms such as search and the profile store. Farms may be used for hosting large capacity public internet sites. Some farms may contain a group of Active Directory servers and a Provisioning Daemon. Cloud manager 105 automatically deploys and/or decommissions virtual machines in the networks to help in meeting the defined target. These farms goals may be automatically and/or manually configured. For example, the farm goals may change to respond to changes in activity and capacity needs. Network Farm—there is one network farm per Network that contains all the VM roles that scale out easily as a resource to the whole Network.

The Cloud Manager Web Service APIs 150 are designed to work in the context of a massively scalable global service. The APIs assume that any network request might fail and/or hang in transit. Calls to cloud manager 105 are configured to be idempotent. In other words, the same call may be made to cloud manager 105 multiple times (as long as the parameters are identical) without changing the outcome.

Cloud manager 105 is designed to do very little processing (<10 ms, <50 ms) before returning a response to any given request. Cloud manager 105 maintains records to keep track of current requests. For example, cloud manager 105 updates records in a local database and if necessary schedules a "job" to perform more lengthy activity later.

Cloud manager keeps track of Images (such as Virtual Disk Images) that are the templates used to deploy new machines within a network. The Image references may be stored in a database, such as database 140, and/or in some other location. The images may be stored in one or more shared data stores that are local to the network(s) on which the image will be deployed. According to one embodiment, each Image includes a virtual machine (VM) role type that specifies the type of VM it can deploy, the number of processors that it should use, the amount of RAM that it will be assigned, a network ID used to find a nearby install point (so they don't get copied repeatedly over the cross data-center links) and a share path that the deployment code can use to access the VHD.

Generally, machines in the networks being managed by cloud system 100 are not upgraded in the traditional manner by downloading data and incorporating the data into the existing software on the machine. Instead, machines are updated by replacing a VHD with an updated VHD. For example, when a new version of software is needed by a farm, a new farm is deployed that has the new version installed. When the new farm is deployed, the tenants are moved from the old farm to the new farm. In this way, downtime due to an upgrade is minimized and each machine in the farm has a same version that have been tested. When a virtual machine needs to be upgraded, the VM on the machine may be deleted and replaced with the VM that is configured to run the desired service.

While upgrades to existing software are not optimal, some servers within the networks do utilize the traditional update procedure of an in-place upgrade. For example, Active Directory Domain Controllers are upgraded by updating the current software on the server without completely replacing an image on the machine. The cloud manager may also be upgraded in place in some instances.

Figure 2:
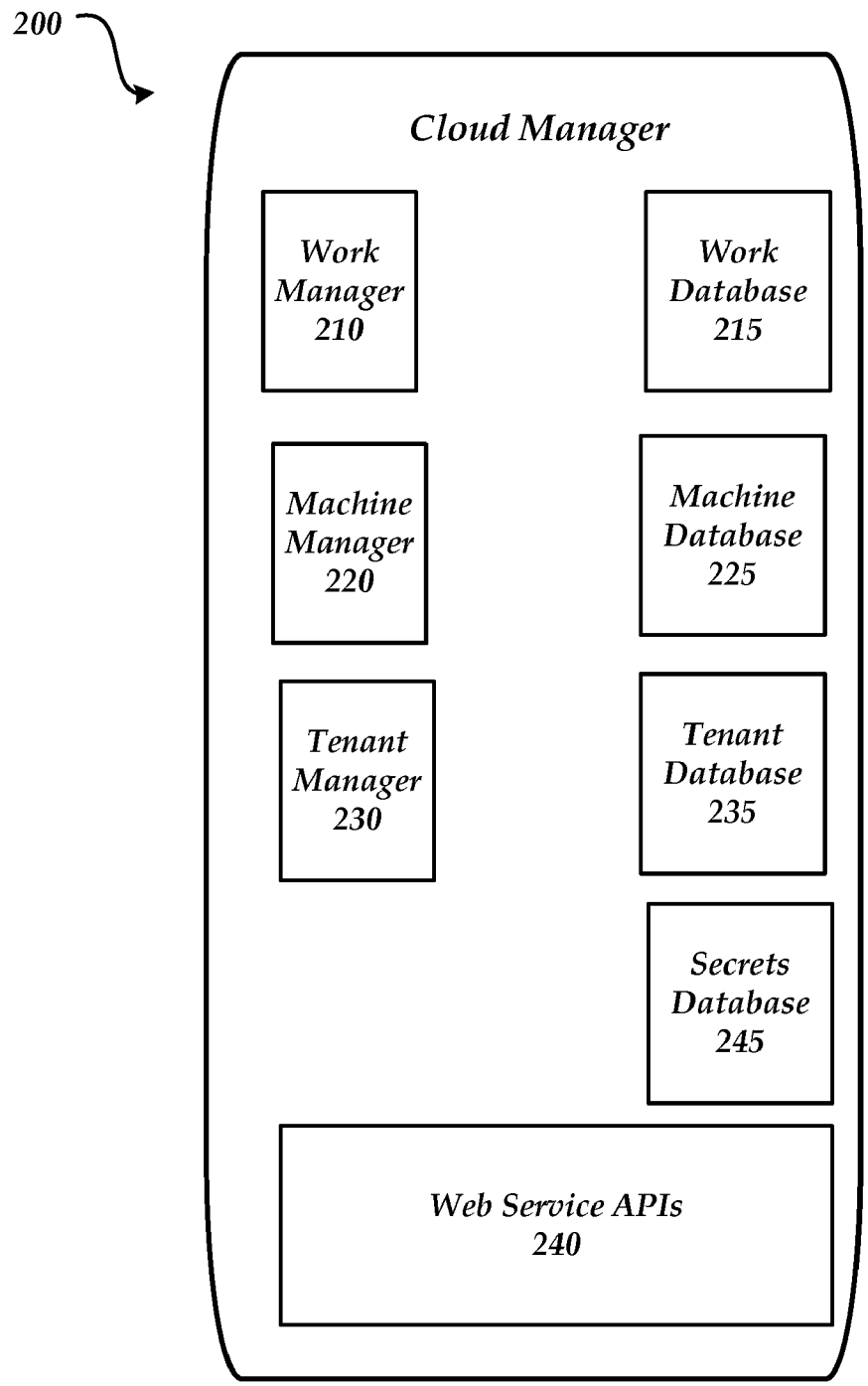
FIG. 2 shows a cloud manager including managers and associated databases.

FIG. 2 shows a cloud manager including managers and associated databases. As illustrated, cloud manager 200 comprises work manager 210, work database 215, machine manager 220, machine database 225, tenant manager 230, tenant database 235, secrets database 245 and web service APIs 240.

Generally, databases used within a cloud management system (e.g. system 100) are sized to enable high performance. For example, a database (such as work database 215, machine database 225, tenant database 235 and secrets database 245) may not exceed a predefined size limit (e.g. 30 GB, 50 GB, 100 GB, and the like). According to an embodiment, a database is sized such that it is small enough to fit in-memory of a physical machine. This assists in high read I/O performance. The size of the database may also be selected based on performance with an application program, such as interactions with a SQL server. The databases used in the farms may also be sized to enable high performance. For example, they may be sized to fit in-memory of the host machine and/or sized such that backup operations, move operations, copy operations, restore operations are generally performed within a predetermined period of time.

Cloud manager 200 divides the cloud manager data into four databases. The work database 215 for the work manager. The machine database 225 for the machine manager 220. The tenant database 235 for the tenant manager 230 and a secrets database 245 for storing sensitive information such as system account and password information, credentials, certificates, and the like. The databases may be on the same server and or split across servers. According to an embodiment, each database is mirrored for high availability and is a SQL database.

Cloud manager 200 is configured to interact with the databases using a reduced set of SQL features in order to assist in providing availability of the cloud manager 200 during upgrades of the databases. For example, foreign keys or stored procedures are attempted to be avoided. Foreign keys can make schema changes difficult and cause unanticipated failure conditions. Stored procedures place more of the application in the database itself Communications with the SQL servers are attempted to be minimized since roundtrips can be expensive compared to the cost of the underlying operation. For example, it is usually much more efficient if all of the current SQL server interactions to a single database are wrapped in a single round-trip.

Constraints are rarely used within the databases (215, 225, 235). Generally, constraints are useful when it helps provide simple updates with the right kind of error handing without extra queries. For example, the fully qualified domain name (FQDN) table has a constraint placed on the "name" to assist in preventing a tenant from accidentally trying to claim the same FQDN as is already allocated to a different tenant.

Caution is used when adding indices. Indices typically improve read performance at the cost of extra I/Os for write operations. Since the data within the databases is primarily RAM resident, even full table scans are relatively fast. According to an embodiment, indices may be added once the query patterns have stabilized and a performance improvement may be determined by proposed indices. According to an embodiment, if adding the index will potentially take a long time the "ONLINE=ON" option may be specified such that the table isn't locked while the index is initially built.

According to an embodiment, upgrades to databases within the cloud manager may be performed without causing downtime to the cloud manager system. In other words, even during an upgrade of the cloud manager, the cloud manager continues processing received requests. As such, changes made to the schema are to be compatible with the previous schema. The SQL schema upgrade is run before the web servers used by the cloud manager are upgraded. When the web servers are upgraded they can start to use the new features enabled in the database. Database upgrades are limited such that operations involved in the upgrade are quick and efficient. For example, tables may be added and new nullable columns may be added to existing columns. New columns may be added at the end of a table. Generally, time consuming operations to the databases are avoided. For example, adding a default value to a newly added column at creation time may be a very time consuming operation when there is a large amount of data. Adding a nullable column, however, is a very quick operation. As discussed above, adding new indices are allowed, but caution should be taken when adding a new constraint to help ensure sure that the schema upgrade won't break with the existing data. For example, when a constraint is added it may be set to a state that is not checked and avoids a costly validation of existing rows and potential errors. Old tables and unused columns are removed after a new version is being used and the cloud manager is not accessing those tables and columns.

Generally, a single row in each of the databases is used to indicate a task and/or a desired state. For example, the tenant database 235 includes a single row for each tenant. A given tenant may include a Required Version record. This record is used to help ensure that the tenant is placed on a farm running the required version. For example, for tenant 1 to stay on SharePoint 14 SP1, the required version for tenant could be set to "14.1." and any version including 14.1 would match and any other versions (e.g. 14.2.xxxx) would not match. The tenant records may include other items such as authorized number of users, quotas (e.g. allowed total data usage, per user data usage, etc.), time restrictions, and the like. Some organization might have multiple tenants that represent different geographies, organizations or capabilities. According to an embodiment, tenants are walled off from each other without explicit invitation of the users (via extranet or other features).

According to one embodiment, each tenant is locked into a specific network. Tenants are kept localized to a small set of databases. A tenant is either small (smaller than would fill one database) in which case it is in exactly one database, shared with other tenants. This implies that all the tenants sharing that database need to upgrade at the same time. When a tenant grows larger it may be moved to its own dedicated database(s) and now might have more than one, but is not sharing databases with other tenants. Maintaining a large tenant in one or more dedicated databases helps in reducing a number of databases that are needed to be upgraded simultaneously in a single upgrade.

Similarly, the work database 215 includes a single row for each job. The machine database 225 may include a row for each physical machine, VM, farm, and the like. For example, machine manager database 225 may include a version string.

According to an embodiment, each VHD, Farm, and VM within a network has an associated version string.

According to one embodiment, the cloud manager includes a simple logging system that may be configured to record a log entry for each web service call. A logging system may be implemented that includes as few/many features as desired. Generally, the logging system is used for measuring usage and performance profiling.

According to an embodiment, the Web Service APIs 240 are built using SOAP with ASP.net. The various Web Methods in the APIs follow two main patterns—Gets and Updates. Generally, the update methods take a data structure as the input and return the same structure as the output. The output structure returns the current state of the underlying object in the database, potentially differing from the input object if validation or other business logic changed some properties or else with additional properties filled in (for example record IDs or other values calculated by the cloud manager). The update methods are used for initial object creation as well as subsequent updates. In other words, callers to the web service APIs 240 can simply request the configuration they want and they don't need to keep track of whether the object already exists or not. In addition this means that updates are idempotent in that the same update call can be made twice with the identical effect to making it only once. According to an embodiment, an update method may include a LastUpdated property. When the LastUpdated property is present, the cloud manager 200 rejects the Update if the value of LastUpdate does not match the one currently stored in the database. Some Update methods include properties that are set on the first invocation of the method and are not set on other invocations of the method.

Cloud manager 200 is configured to avoid the use of callbacks. Since callbacks may be unreliable, clients interacting with cloud manager 200 may check object status using a web service API when they want to check a status of an update. According to an embodiment, a call to an update method causes cloud manager 200 to set the state of the underlying object to "Provisioning" and when the updates are completed the state is set to "Active".

Figure 3:
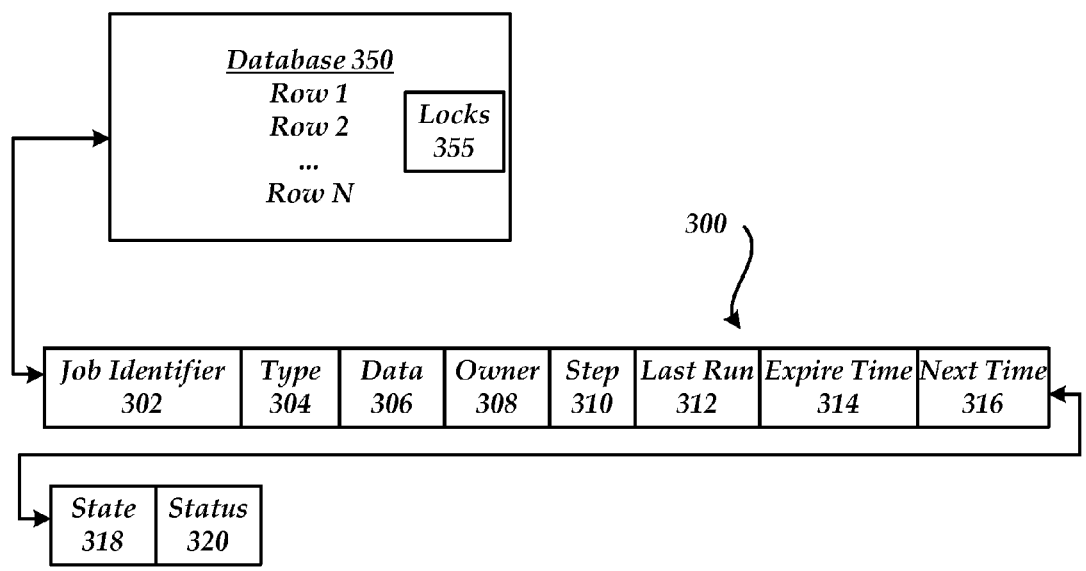
FIG. 3 shows an exemplary job record stored within a row of a database.

FIG. 3 shows an exemplary job record stored within a row of a database. As illustrated, record 300 comprises job identifier 302, type 304, data 306, owner 308, step 310, last run 312, expire time 314, next time 316, state 318 and status 320.

Generally, for each task that is requested to be performed, the cloud manager creates a record in database 350 (e.g. work database 215 in FIG. 2).

Job identifier 302 is used to specify a unique identifier for the requested task.

Type 304 specifies the task to perform. For example, the type may include a name of the script to be executed. For example, when the task is to run the script named "DeployVM.ps1" then the data 306 may include the identifier (e.g. "-VMID 123"). This allows new task types to be added to the system without requiring any changes to compiled or other binary parts of the system.

Data 306 is used to store data that is associated with the task. For example, the data may be set to the tenant, machine, network, VM, etc. on which the task is to be performed. The data 306 may also store one or more values to which a value in a database is set. The process running the task may look to the job record to see what value the desired number of machines is set to. The script uses the value in the database to perform the operation.

Owner 308 specifies a process/machine that is executing the process. For example, when a cloud manager machine starts execution of a job, the machine updates the owner 308 portion of the record with an ID of the machine.

Step 310 provides an indication of a step of the current script. For example, the script may divide a task into any number of steps. As the process completes a step of the script, step 310 is updated. A process may also look at step 310 to determine what step to execute in the script and to avoid having to re-execute previously completed steps.

Last run 312 provides a time the script was last started. Each time a script is started, the last run time is updated.

Expire time 314 is a time that indicates when the process should be terminated. According to an embodiment, the expire time is a predetermined amount of time (e.g. five minutes, ten minutes . . . ) after the process is started. The expire time may be updated by a requesting process through the web service API.

Next time 316 is a time that indicates when a task should next be executed. For example, a process may be stopped after completion of a step and be instructed to wait until the specified next time 316 to resume processing.

State 318 indicates a current state and Status 320 indicates a status of a job (e.g. Created, Suspended, Resumed, Executing, Deleted).

Duplicate rows in the database can be removed before they are performed if they have the same task type and data values. For example, multiple requests may be made to perform the same task that are stored in multiple rows of the database.

A job can have one or more locks 355 associated with it. If locks are not available then a job will not be scheduled to run until the locks are available. The locks may be configured in many different ways. For example, the locks may be based on a mutex, a semaphore, and the like. Generally, a mutex prevents code from being executed concurrently by more than one thread and a semaphore restricts a number of simultaneous uses of a shared resource up to a maximum number. According to an embodiment, a lock is a character string that represents a resource. The resource may be any type of resource. For example, the lock may be a farm, a machine, a tenant, and the like. Generally, the locks are used to defer execution of one or more tasks. Each job may specify one or more locks that it needs before running. A job may release a lock at any time during its operation. When there is a lock, the job is not scheduled. A job needing more than one lock requests all locks required at once. For example, a job already in possession of a lock may not request additional locks. Such a scheme assists in preventing possible deadlock situations caused by circular lock dependencies amongst multiple jobs.

Figure 4:
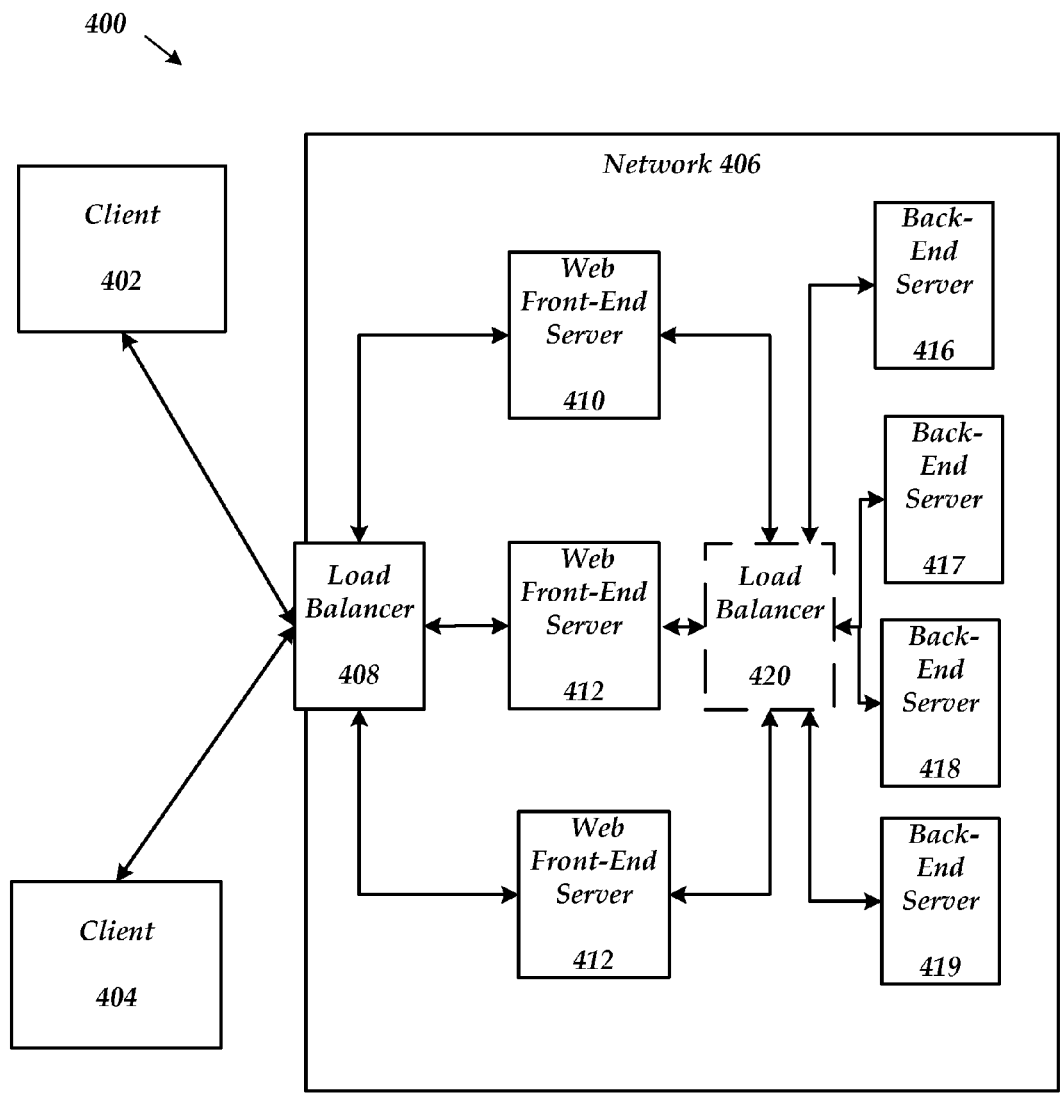
FIG. 4 shows an example system for a network including front-end and back-end servers for an online service.

FIG. 4 shows an example system 400 for a network including front-end and back-end servers for an online service. The example system 400 includes clients 402 and 404, network 406, load balancer 408, WFE servers 410, 412, 414 and back-end servers 416-419. Greater or fewer clients, WFEs, back-end servers, load balancers and networks can be used. Additionally, some of the functionality provided by the components in system 400 may be performed by other components. For example, some load balancing may be performed in the WFEs.

In example embodiments, clients 402 and 404 are computing devices, such as desktop computers, laptop computers, terminal computers, personal data assistants, or cellular telephone devices. Clients 402 and 404 can include input/output devices, a central processing unit ("CPU"), a data storage device, and a network device. In the present application, the terms client and client computer are used interchangeably.

WFEs 410, 412 and 414 are accessible to clients 402 and 404 via load balancer 408 through network 406. As discussed, the servers may be configured in farms. Back-end server 416 is accessible to WFEs 410, 412 and 414. Load balancer 408 is a dedicated network device and/or one or more server computers. Load balancer 408, 420, WFEs 410, 412 and 414 and back-end server 416 can include input/output devices, a central processing unit ("CPU"), a data storage device, and a network device. In example embodiments, network 406 is the Internet and clients 402 and 404 can access WFEs 410, 412 and 414 and resources connected to WFEs 410, 412 and 414 remotely.

In an example embodiment, system 400 is an online, browser-based document collaboration system. An example of an online, browser-based document collaboration system is Microsoft Sharepoint® from Microsoft Corporation of Redmond, Wash. In system 400, one or more of the back-end servers 416-419 are SQL servers, for example SQL Server from Microsoft Corporation of Redmond, Wash.

WFEs 410, 412 and 414 provide an interface between clients 402 and 404 and back-end servers 416-419. The load balancers 408, 420 direct requests from clients 402 and 404 to WFEs 410, 412 and 414 and from WFEs to back-end servers 416-419. The load balancer 408 uses factors such as WFE utilization, the number of connections to a WFE and overall WFE performance to determine which WFE server receives a client request. Similarly, the load balancer 420 uses factors such as back-end server utilization, the number of connections to a server and overall performance to determine which back-end server receives a request.

An example of a client request may be to access a document stored on one of the back-end servers, to edit a document stored on a back-end server (e.g. 416-419) or to store a document on back-end server. When load balancer 408 receives a client request over network 406, load balancer 408 determines which one of WFE server 410, 412 and 414 receives the client request. Similarly, load balancer 420 determines which one of the back-end servers 416-419 receive a request from the WFE servers. The back-end servers may be configured to store data for one or more tenants (i.e. customer).

Figure 5:
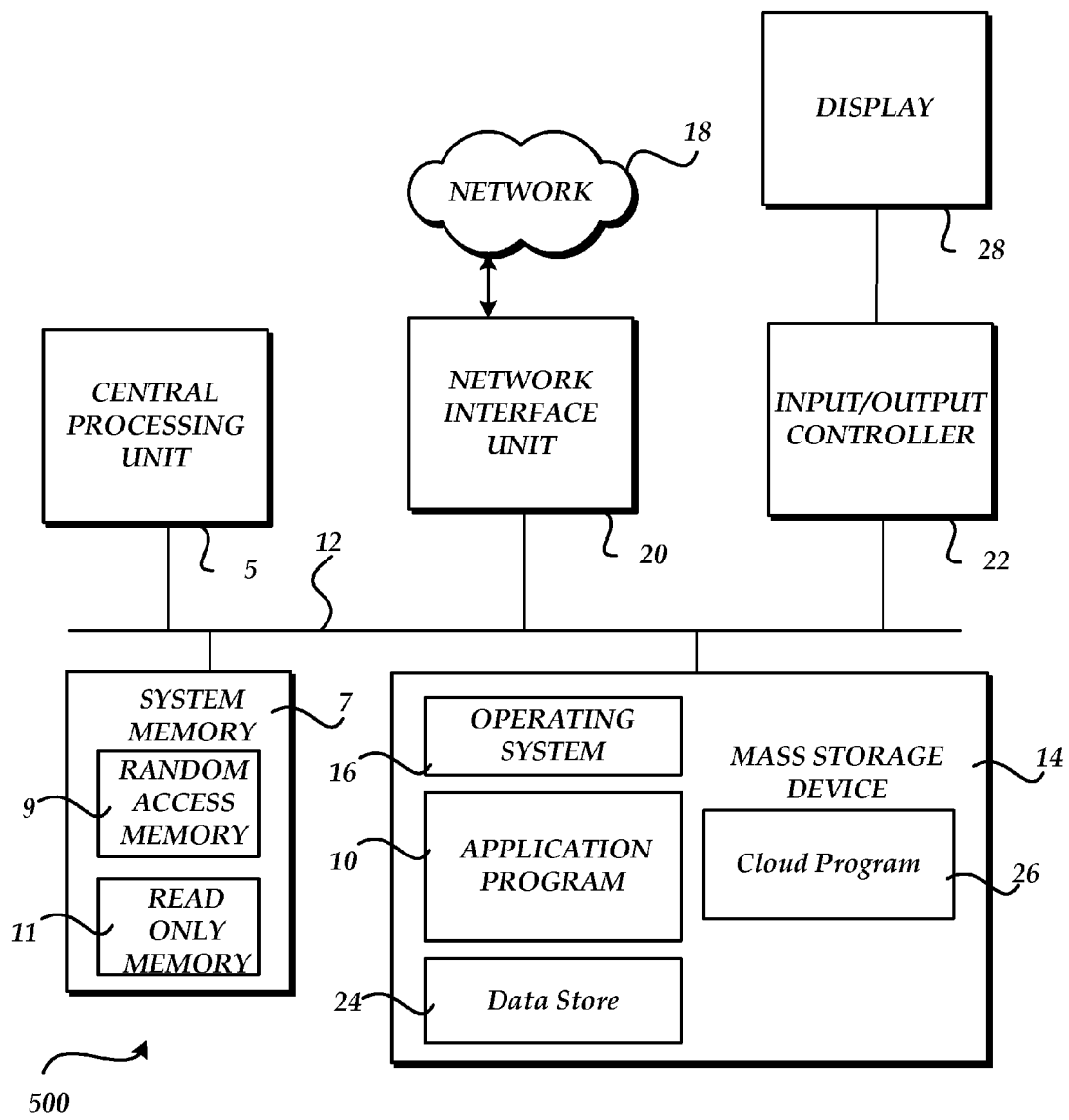
FIG. 5 illustrates a computer architecture for a computer.

Referring now to FIG. 5, an illustrative computer architecture for a computer 500 utilized in the various embodiments will be described. The computer architecture shown in FIG. 5 may be configured as a server, a desktop or mobile computer and includes a central processing unit 5 ("CPU"), a system memory 7, including a random access memory 9 ("RAM") and a read-only memory ("ROM") 11, and a system bus 12 that couples the memory to the central processing unit ("CPU") 5.

A basic input/output system containing the basic routines that help to transfer information between elements within the computer, such as during startup, is stored in the ROM 11. The computer 500 further includes a mass storage device 14 for storing an operating system 16, application programs 10, data store 24, files, and a cloud program 26 relating to execution of and interaction with the cloud system 100.

The mass storage device 14 is connected to the CPU 5 through a mass storage controller (not shown) connected to the bus 12. The mass storage device 14 and its associated computer-readable media provide non-volatile storage for the computer 500. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 500.

According to various embodiments, computer 500 may operate in a networked environment using logical connections to remote computers through a network 18, such as the Internet. The computer 500 may connect to the network 18 through a network interface unit 20 connected to the bus 12. The network connection may be wireless and/or wired. The network interface unit 20 may also be utilized to connect to other types of networks and remote computer systems. The computer 500 may also include an input/output controller 22 for receiving and processing input from a number of other devices, including a keyboard, mouse, or electronic stylus (not shown in FIG. 5). Similarly, an input/output controller 22 may provide output to a display screen 28, a printer, or other type of output device.

As mentioned briefly above, a number of program modules and data files may be stored in the mass storage device 14 and RAM 9 of the computer 500, including an operating system 16 suitable for controlling the operation of a networked computer, such as the WINDOWS® operating systems from MICROSOFT® CORPORATION of Redmond, Wash. The mass storage device 14 and RAM 9 may also store one or more program modules. In particular, the mass storage device 14 and the RAM 9 may store one or more application programs, such as cloud program 26, that perform tasks relating to the cloud system.

Figure 6:
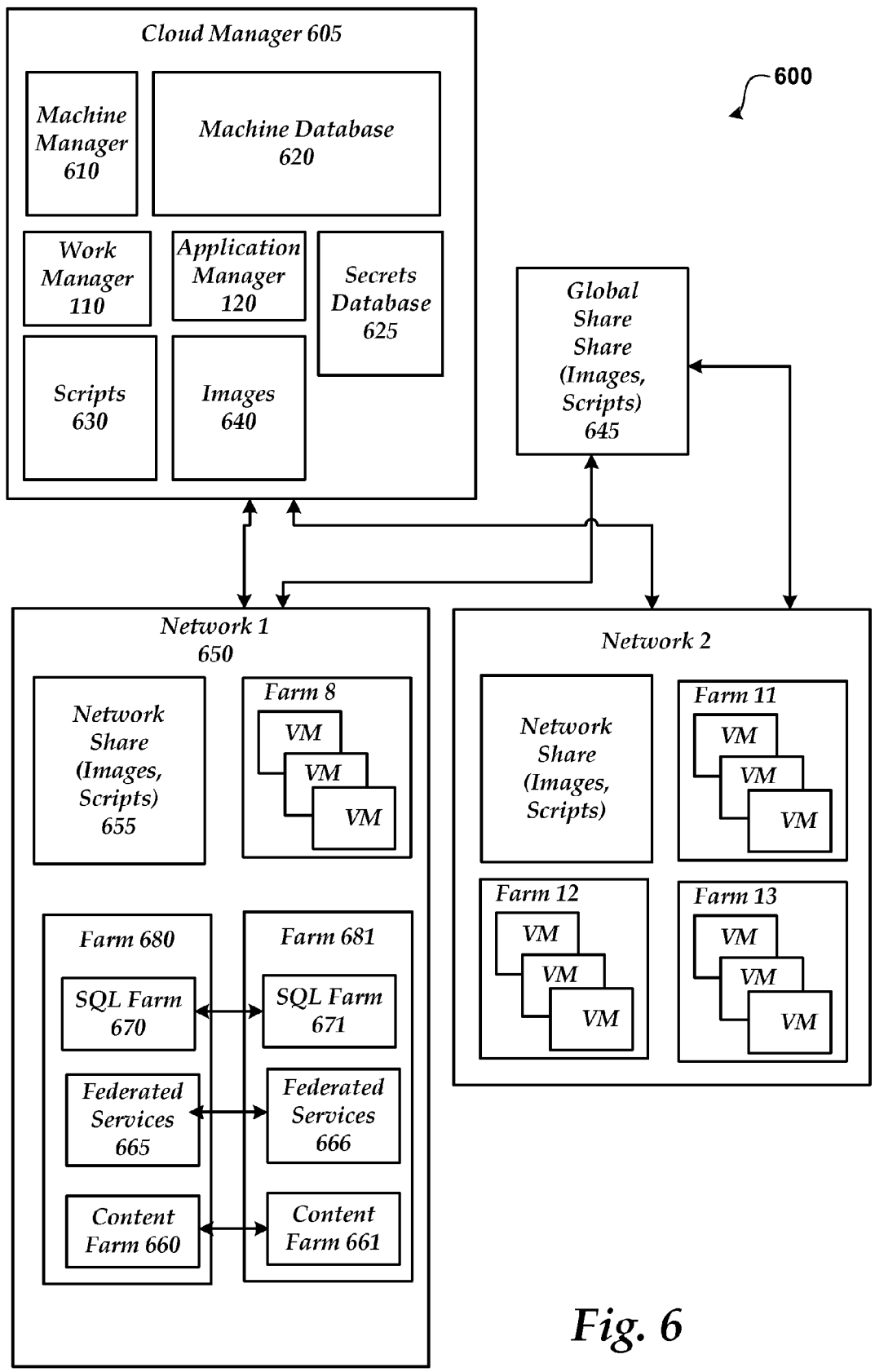
FIG. 6 shows a system for managing deployment of farms for an online service.

FIG. 6 shows a system for managing deployment of farms for an online service. As illustrated, system 600 shows a cloud manager 605 comprising work manager 110, application manager 120, machine manager 610, machine database 620, scripts 630 and images 640.

Machine manager 610 controls the automatic deployment of large numbers of servers in specific topologies across different networks (Network 1, Network 2). While only two networks are shown, many more networks are generally managed (e.g. ten, one hundred, one thousand, ten thousand, and the like). Cloud manager 605, and its components, operates and is configured similarly to the cloud manager system shown and described above. Machine manager 610 may be used to deploy and manage machines for many types of online services.

Machine manager 610 understands the physical topology of the networks and keeps track of the location of the physical machines which are members within each of the networks. According to an embodiment, machine manager 610 knows a location of each rack within the networks and each machine that is located within the rack. Machine manager 610 also keeps track of the specific versions of software that is being used on each of the machines as well as the Virtual Machine (VM) Images that are installed on each of the machines. Each VM image corresponds to a different server role.

Machine manager 610 is also configured to determine the roles for each of the machines within each of the farms. This determination may be performed manually and/or dynamically. For example, a farm may be initially defined to include fifteen machines, five of which are located within a content farm 660, five in a federated services farm 665, and five in a SQL farm 670. During operation of the online service, machine manager 610 may collect performance characteristics relating to the farms and machines within a network and dynamically adjust the resources of the network based on the collected performance characteristics. For example, when it is determined that a content farm is overloaded, machine manager 610 may create a job that deploys another machine within the content farm to provide additional bandwidth. The health of the machines/networks may also be monitored. Machine manager 610 may replace machines within a network, direct traffic to a new set of machines, and/or perform some other actions in response to the determination of the health of the machines. For example, if one or more farms go down, machine manager 610 deploys a new farm and directs the traffic to the newly deployed farms.

Machine manager 610 keeps track of virtual machines which are the actual servers that do the work of the service and stores this information in a data store, such as machine database 620. As discussed, each of the VMs have a specific role representing the function of the specific server and they are further grouped into farms which are typically a group of machines running the exact same version of the software that work together. According to an embodiment, machine manager 610 stores a table in machine database 620 for each farm that specifies the goals and the roles within the farm. A number of machines for each role and farm is also stored within machine database 620. The number of machines within a farm may be manually configured and/or automatically configured. For example, a background process can monitor the load and determine dynamically the farm goals. The machine manager 610 may start machines and/or stop machines based on the current/anticipated network characteristics. Each farm within a network may be configured with a same number of machines as other farms or a different number of machines. For example, one content farm may include six machines whereas another content farm may use only three machines.

When new software is available, machine manager 610 manages the deployment of the new software. Generally, individual machines within a farm/network are not upgraded or patched. Instead, machine manager 610 starts jobs managed by the work manager 110 that deploys new machines and farms that include the new software. After the new farm is configured with the new software, machine manager 610 moves the traffic/load to the new farm and stops the traffic from going to the old farm.

During the upgrade, the new farm may be configured to better handle the traffic that was being directed to the old farm. For example, it may be determined from monitoring of farm 680, that more SQL machines are needed to handle the load. During the upgrade from farm 680 to farm 681, machine manager 610 may add/remove machines from the farm.

Images 640 are configured to store Virtual Hard Disk (VHD) images that are in use and/or are to be deployed on one or more of the machines in one or more of the networks. According to an embodiment, the MICROSOFT® VHD file format is used that specifies a virtual machine hard disk that can reside on a native host file system encapsulated within a single file. Other formats may be used. Generally, the VHD format is broadly applicable since it is agnostic to the virtualization technology, host operating system, or guest operating system with which it is used. Images that are used within a specific network may be moved to a global share 645 and/or to a network share that is local to a network (e.g. network share 655). Storing the images on a network share saves time in a deployment of images since network communication time is reduced.

Differential VHDs may also be used. For example, only the differences between the latest version of a VHD and the previous version may be deployed. Different techniques may be used for this differential comparison. For example, Remote Differential Compression techniques may be used to determine the differences and copy only the changes to the network shares. This allows a process to speed up deployment and updates to machines within a network since the full copy of the VHD does not need to be copied. Deltas within a network may also be employed. Deltas are sent as files and then within the local machine/local network the files can be used to create the complete VHD.

According to an embodiment, machine manager 610 doesn't actually install the software on the machines. Instead, as discussed previously, a job is placed in a job queue that when executed performs actions to complete the task. Once the images are installed on the machines, machine manager 610 starts the machine running. Zero or more role-specific scripts that can do role-specific customizations of the deployment may be run after the Virtual Machine is started. These scripts may be located within the network's share (e.g. network share 655), a global share 645, scripts 630 or some other location.

According to an embodiment, the VHDs are non-changeable once they are running on the machines. The operating system files may also be locked down such that they can not be changed. According to an embodiment, each farm runs its services in one of two accounts including an application pool account and an administrative account. Each service and/or application may also run with unique credentials. These accounts are created for each farm and are generated by machine manager 610. The accounts include randomly generated passwords. Generally, humans are not supplied with the passwords for the farm. The application account is used to run processes relating to the online service (e.g. SharePoint). According to an embodiment, the application pool account is not logged into and there is not a web application interface to access the database that stores the passwords. During configuration of the farm, the process executing the script is provided with the required password(s) to set up and deploy the machine. These secrets may be stored in a database such as machine database 620, a secrets database 625 for storing secrets, and the like. For example, when a process to deploy a farm is executed, the passwords are supplied to the deploy farm process so that the farm may be configured and started. During the installation of the images and any customizing of the configuration, the farm is not connected to the online service and as such does not have any traffic. Once traffic is directed to the farm, the machine is locked down and the passwords are not accessible on the machine or through a web interface. While the farm is processing requests, machine manager 610 may monitor the machines and the VHD images to determine if there have been unauthorized/unapproved changes. If they are, machine manager 610 may deploy a new farm to replace the potentially compromised farm. In this way, any code that was placed onto the old farm is not replicated to the newly deployed farm.

When multiple farms are to be upgraded (e.g. content farm 660, federated services farm 665, and SQL farm 670) machine manager deploys a new farm for each of the farms to be upgraded (e.g. content farm 661, federated services farm 666, and SQL farm 671). According to an embodiment, the content farm is upgraded first, then the federated services farm.

For example, when content farm 660 is to be upgraded, new content farm 661 is deployed. After provisioning the machines, the content databases within the farm that is currently being upgraded are copied to the new farm. A SQL farm is deployed such that the content databases may be attached to it. Before moving a database, the database is backed up. A backup of the database may be created at any point before copying the database to the new farm. After the backup is complete, the database is marked as read only and the database is copied to the new farm. The databases in the farm may be copied in parallel or serial. For example, each database may be copied one at a time until all of the databases are migrated to the new content farm or more than one database may be copied at a time. According to an embodiment, databases are copied one at a time in a content farm.

Any databases that fail the upgrade remain behind to be served on the old farm and for further troubleshooting. Another sequence of upgrade (to the already existing new farm) can be performed after troubleshooting the problem. In the interim (during the troubleshooting), users get Read-Write access to their (un-upgraded) data.

The copy of the database on the new farm is attached to the new farm as read/write and a mirror of the database is created for the new farm. Any database upgrades may be performed on the new farm before directing requests to access content in the newly created database in the new farm. For example, the database may be upgraded to run the latest schema version. Content within the database may also be modified. For example, any fully qualified domain name (FQDN) that are contained in the new database are redirected at the load balancer to the new farm. Machine manager 610 may schedule one or more jobs to perform the upgrades. After the content farm is deployed, the applications on the new farm are connected to other services. For example, after new content farm 661 is deployed and the databases copied and upgraded, it may be connected to the old services (e.g. federated services 665) since the new services farm 666 has not been upgraded yet. This means that, in addition to services providing backward compatibility hooks, service proxies are backward compatible and be capable of talking to services that are a version behind them. The databases in the old farm may be removed after successful deployment to the new farm (e.g. 1 hour, 1 day, 7 days, and the like. The old farm may then be unprovisioned. The deployment of other types of farms is handled in a similar manner (See FIGS. 7-10 for more discussion).

Figure 7:
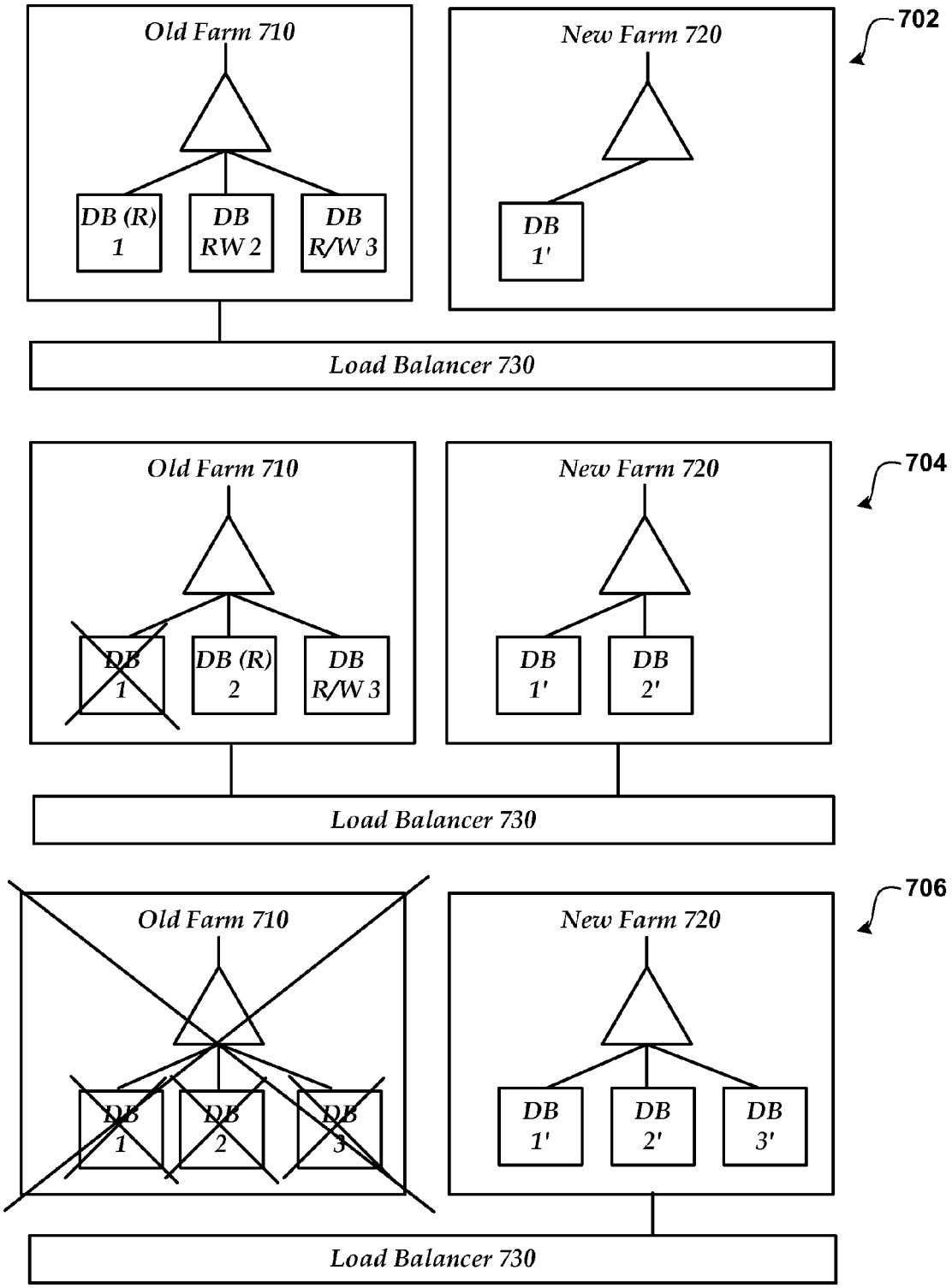
FIG. 7 shows moving databases from an old farm to a new farm that is being deployed.

FIG. 7 shows moving databases from an old farm to a new farm that is being deployed. For purposes of this example, and not to be limiting, assume that old farm 710 has three databases (DB 1, DB 2 and DB 3) that are to be moved to new farm 720.

State 702 shows a state of old farm 710 and new farm 720 while DB 1 is being copied after new farm 720 is deployed. After DB 1 is backed up in old farm 710, DB 1 is placed into a read only state and is copied over to new farm 720. The databases in the old farm may be backed up at the same time and/or at different times. During the copying of DB 1, load balancer 730 continues to send all of the requests to old farm 710.

State 704 shows a state of old farm 710 and new farm 720 after database DB 1 has been copied over and is placed in service. When database DB 1 has been copied to new farm 720, any changes made to the data on the old farm since the backup was initially performed are obtained and added to the data copied to the new farm. Since the time period between the full backup and the transactional backup is relatively short (e.g. a few minutes) the time period that the database is unavailable for writing is also short. Any upgrades to the database are also performed before directing requests to the database. For example, DB 1' in the new farm may be upgraded to a new schema version to handle different operations as compared to the old farm. After any changes/updates are made to the newly created DB 1', load balancer 730 is configured to direct requests to DB 1' in new farm 720. DB 1 in the old farm is no longer used after DB 1' starts receiving the requests. When DB 2 is finished copying to new farm 720 and DB 2' has finished the upgrade process, load balancer 730 directs requests for DB 2 to DB 2' in new farm 720.

State 706 shows a state of old farm 710 and new farm 720 after all of the databases (DB 1, DB 2, and DB 3) have been copied over and are placed in service. When the provisioning and deployment of new farm 720 is successful, all of the traffic from old farm 710 is directed to new farm 720. At this point, the newly deployed farm receives and processes all of the requests that were previously directed to the old farm. If a problem is detected during the deployment of the farm, the old farm may continue to be utilized. Old farm 710 may be unprovisioned after successfully deploying new farm 720.

Figure 8:
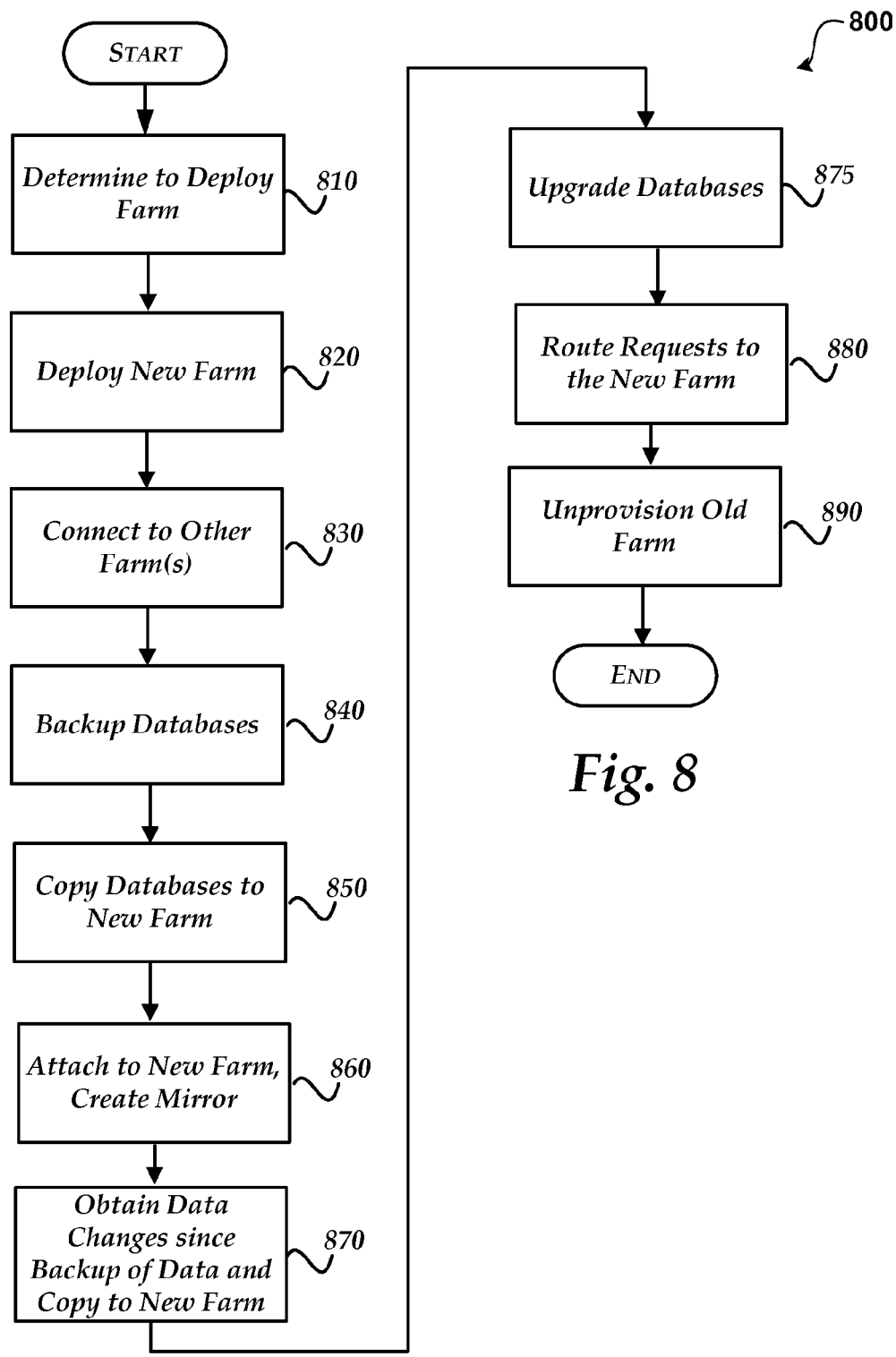
FIG. 8 shows a process for deploying a new farm, such as a content farm.
Figure 9:
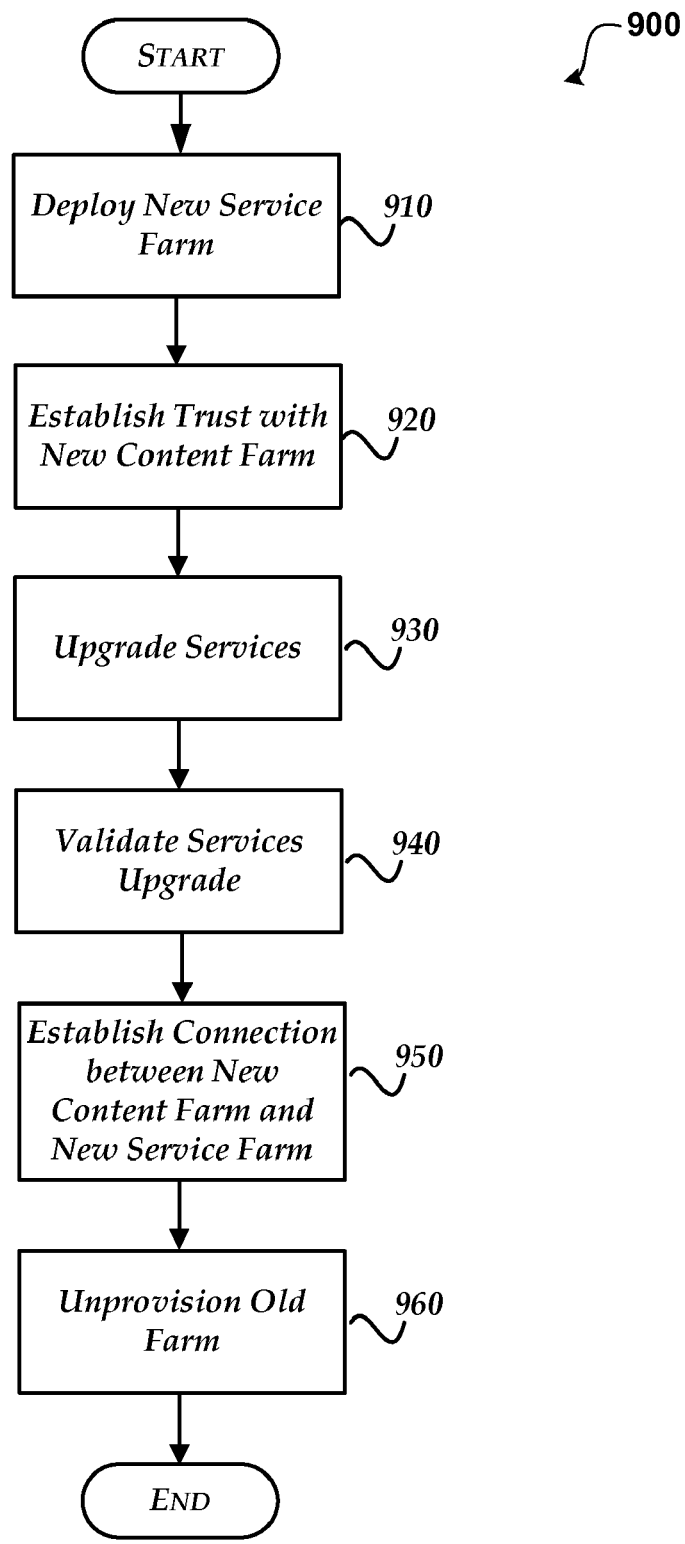
FIG. 9 illustrates a process for deploying a new services farm.
Figure 10:
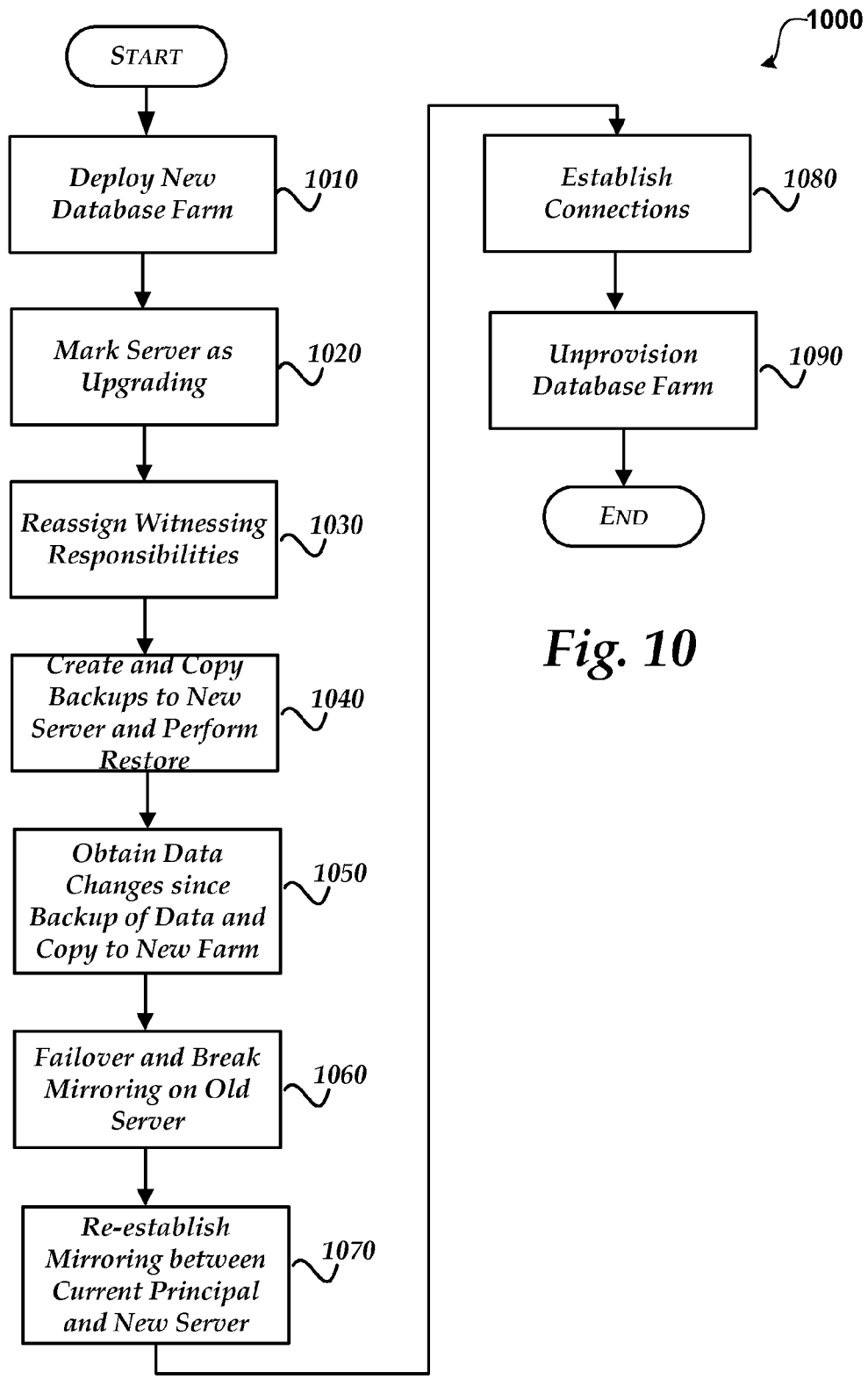
FIG. 10 illustrates a process for deploying a new database farm.

FIGS. 8-10 illustrate different procedures for deploying farms.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 8 shows a process for deploying a new farm, such as a content farm. After a start operation, the process 800 flows to operation 810, where a determination is made to deploy a farm. The farm may be deployed for many different reasons. For example, one or more farms may be deployed to run a different version of software from existing farms, a new network may be deployed, equipment may fail, and the like. The determination may occur from a request through an API, such as a Web Service API as described above, and/or may be determined automatically. For example, when the goals of a farm change, a new farm may be manually/automatically deployed.

Moving to operation 820, the new farm is deployed. According to an embodiment, the provisioning of the machines is performed asynchronously such that the machine manager can continue to perform other actions. Deploying of the farm may include many different steps. For example, imaging the physical machines with VHDs to provide the roles of the farm, perform any customizations to the installations, and starting the machines. The VHDs may also be moved to the network(s) that are going to use them such that copy operations are performed within a network rather than across networks. When multi-tier farms are to be deployed, each tier may be deployed in a predetermined order. According to an embodiment, content farms are deployed before federated services farm that are deployed before database (e.g. SQL) farms. The ordering of the upgrade of farm may help in reducing the complexity of an upgrade of a farm. For example, data stored in the service farm on behalf of the content farm is migrated at the same time for all tenants. If a service farm were to be upgraded first, service data tied to content may need to be constantly migrated or refreshed as content moves from the old content farm to the new content farm. Upgrading a farm first (e.g. content farm) may also provide better scaling where there are more content farms than service farms.

Moving to operation 830, the newly deployed farm may be connected to other farms in the multi-tier deployment. For example, when a new content farm is deployed it is connected to the old federated services farm.

Flowing to operation 840, the databases from the old farm are backed up. The databases may be backed one at a time and/or in parallel. The backup may be performed at different times. For example, while the machines in the new farm are being provisioned, after the machines in the new farm have been provisioned and the like. The databases may continue to receive read/write requests during the backup process.

Moving to operation 850, the databases are copied from the old farm to the new farm. The old farm being upgraded continues to receive and process requests during the upgrade process. The databases may be copied at different times. For example, the databases may be copied to the new farm one at a time, two at a time, all together, and the like. The databases may also be copied on a per tenant basis. For example, when a tenant occupies more than one database, each database that the tenant occupies may be copied in parallel. The databases may also be copied based on a type of content. For example, databases in a services farm may all be copied at one time, whereas SQL databases and/or content farm databases may be copied in a particular order. During the copy of a database, the database that is being copied is restricted from adding any new tenants.

Transitioning to operation 860, the database(s) are attached to the new farm and a mirror for the database(s) are created on the new farm.

Moving to operation 870, the changes made to the data on the old farm since the backup was initially performed are obtained and added to the data copied to the new farm. During this operation, the data on the old farm is marked as read only such that for a short period of time, writes are not allowed to the data on the old farm. Since the time period between the full backup and the transactional backup is relatively short (e.g. a few minutes) the time period that the database is unavailable for writing is also short.

Flowing to operation 875, any upgrades to the databases are performed. For example, the databases in the new farm may be upgraded to a new schema version to handle different operations as compared to the old farm. As discussed above, the new farm is not receiving any of the requests during the upgrade process. Other items within the database may also be changed/modified.

Flowing to operation 880, when the provisioning and deployment of the new farm is successful, the traffic from the old farm is directed to the new farm. At this point, the newly deployed farm receives and processes all of the requests that were previously directed to the old farm. If a problem is detected during the deployment of the farm, the old farm may continue to be utilized. Further, traffic may also be redirected back to the old farm. The process then moves to an end block and returns to processing other actions.

Moving to operation 890, the old farm is unprovisioned. The old farm may be unprovisioned immediately or at a another time. For example, a period of time may be set to verify that the new farm is operating properly. The databases may be removed at the same time as the unprovisioning and/or at a different time. For example, the databases may be removed after a day, seven days, thirty days, and the like.

FIG. 9 illustrates a process for deploying a new services farm.

After a start operation, the process flows to operation 910 where a new services farm is deployed. According to an embodiment, when a new content farm is to be deployed, the services farm is deployed after the deployment of the new content farm. As discussed above, deploying a farm generally comprises imaging the physical machines with VHDs to provide the roles of the farm (in this case services), perform any customizations to the installations, and starting the machines.

Moving to operation 920, trust is established between the new content farm and the new services farm such that they more communicate and work cooperatively.

Flowing to operation 930, the services on the new services farm are upgraded. According to an embodiment, the federated services farm hosts services including search, user profiles, managed metadata, and web analytics. More or fewer services may be hosted. For example, subscription settings, secure store service, and the like. The service farm may also provide a usage logging service application with a logging database.

Upgrading the services generally follows the deployment of a new farm as described with respect to FIG. 8. For each service in the old services farm, a backup is created for each service database, new service applications in the new service farm are created with a copy of each of the databases copied from the old service farm, and a proxy is created in the new content farm for each of the service applications.

Transitioning to operation 940, the services upgrade is validated. When the upgrade fails, the old services farm may be used. Other attempts may be made to deploy a new service farm. The new content farm may continue to use the old services until a new services farm is deployed.

Moving to operation 950, a connection between the new service farm and the new content farm is established and any connection to the old service farm is removed.

Flowing to operation 960, the old service farm is unprovisioned.

FIG. 10 illustrates a process for deploying a new database farm.

After a start operation, the process flows to operation 1010, where a new database farm is deployed. According to an embodiment, a database farm is deployed after the deployment of any content farm and services farm deployment. As discussed above, deploying a farm generally comprises imaging the physical machines with VHDs to provide the roles of the farm, perform any customizations to the installations, and starting the machines. According to an embodiment, SQL servers are deployed to replace the old SQL servers. The number of servers deployed may be different from the old farm. For example, there may be the same number of servers, a larger number of servers, or a smaller number of servers.

Moving to operation 1020, for each old SQL server that is being replaced, it is marked as upgrading. During the upgrade process the old SQL server continues to be used but may be restricted in its operations.

Flowing to operation 1030, for each witnessing session on each of the old servers, the witnessing responsibilities are reassigned to another running server in the newly deployed farm.

Transitioning to operation 1040, backups are created on the old servers and copied to the new servers that each perform a restore operation.

Moving to operation 1050, any changes since the time of the backup are incorporated into the appropriate databases on the new servers.

Flowing to operation 1060, failover and the breaking of the mirroring for the databases on the old server is performed. According to an embodiment, one failover occurs at a single time.

Transitioning to operation 1070, mirroring is re-established between the current principal and new server.

Moving to operation 1080, the connections between the different farms are established with the new database farms. At this point, the new content farm, the new services farm and the new database farms are coupled.

Flowing to operation 1090, the old database farm is unprovisioned.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for upgrading farms in an online service, comprising:
   determining when to deploy a new farm in a network to replace an old farm;
   deploying the new farm; wherein deploying the new farm comprises provisioning different machines in the new farm to perform different roles for the online service; wherein the machines performing a same role are arranged in a highly available configuration;
   creating a backup for each database in the old farm while continuing to allow reads and writes to the database while the database is being backed up;
   copying each database in the old farm to the new farm; while continuing to allow reads and writes to the databases previously backed up in the old farm; wherein the old farm continues to process requests for the roles provided by the old farm;
   performing any upgrades to the databases in the new farm;
   automatically routing requests from the old farm to the new farm; and
   unprovisioning the old farm.

2. The method of claim 1, wherein provisioning the machines in the new farm comprises automatically starting a process to deploy the new farm within the network; wherein deploying the farm comprises provisioning software on the machines within the farm using virtual hard disk (VHD) images, and starting the machines.

3. The method of claim 1, further comprising marking each database in the old farm as read only during a time period that each database is being copied to the new farm.

4. The method of claim 1, further comprising updating the databases copied to the new farm with any data that changed on the old farm since a time the data was backed up on the old farm.

5. The method of claim 1, further comprising automatically adjusting a configuration of the new farm during deployment to load balance the new farm.

6. The method of claim 1, wherein determining when to deploy the new farm to replace the old farm comprises determining when the old farm has at least a potential security breach.

7. The method of claim 1, wherein deploying the new farm comprises automatically deploying: a content farm; a federated services farm; and a SQL farm.

8. The method of claim 7, wherein the content farm is deployed first and the federated services farm second.

9. The method of claim 1, wherein deployment of the new farm initially has a portion of a determined number of machines to be deployed.

10. A computer-readable storage medium having computer-executable instructions for deploying farms for an online service, comprising:
    machines are arranged within farms within each of the networks, wherein the role is used to determine one or more virtual machines to install the machines, wherein the configuration stores a goal for each of the farms and a role for each of the farms;
    determining when to deploy a new farm in a network to replace an old farm; wherein the new farm and the old farm comprise a first group of virtual machines to perform a first role; a second group of machines to perform a second role; and a third group of machines to perform a third role;
    deploying the new farm; wherein deploying the new farm comprises provisioning physical machines within the network with virtual machines to perform the first role, the second role and the third role; wherein the physical machines and the virtual machines are arranged in a highly available configuration;
    creating a backup for each database in the old farm while continuing to allow reads and writes to the database while the database is being backed up;
    copying each database in the old farm to the new farm; while continuing to allow reads and writes to the databases previously backed up in the old farm; wherein the old farm continues to process requests for the roles provided by the old farm;
    marking each database in the old farm as read only during a time period that each database is being copied to the new farm;
    performing any upgrades to the databases in the new farm;
    automatically routing requests from the old farm to the new farm; and
    unprovisioning the old farm.

11. The computer-readable storage medium of claim 10, wherein the first group of virtual machines is a content farm; the second group of machines is a federated services farm; and a third group of machines is a database farm.

12. The computer-readable storage medium of claim 11, wherein deploying the new farm comprises automatically deploying the content farm first followed by deploying the federated services farm followed by deploying the database farm.

13. The computer-readable storage medium of claim 11, wherein provisioning the machines in the new farm comprises automatically starting a process to deploy the new farm within the network; wherein deploying the farm comprises provisioning the machines within the farm using virtual hard disk (VHD) images, and starting the machines.

14. The computer-readable storage medium of claim 11, further comprising updating the databases copied to the new farm with any data that changed on the old farm since a time the data was backed up on the old farm.

15. The computer-readable storage medium of claim 11, further comprising automatically adjusting a configuration of the new farm during deployment to load balance the new farm.

16. The computer-readable storage medium of claim 11, wherein determining when to deploy the new farm to replace the old farm comprises determining when the old farm has at least a potential security breach.

17. A system for deploying farms for an online service, comprising:

a network comprising physical machines, virtual machines and databases; wherein the virtual machines are arranged in farms that each perform a role; wherein the farms comprise content farms, federated services farms and SQL farms that are arranged together in groups;
a processor and a computer-readable storage medium;
an operating environment stored on the computer-readable medium and executing on the processor; and
software that is operative to:
  store a configuration of machines in farms of different networks for the online service, wherein the configuration includes a location of each of the machines that includes a rack location of the machine and roles of the machines in the networks; wherein the role is used to determine one or more virtual machines to install the machines, wherein the configuration stores a goal for each of the farms and a role for each of the farms;
  determine when to deploy a new farm in a network to replace an old farm;
  deploy the new farm; wherein deploying the new farm comprises provisioning the physical machines within the network with virtual machines to perform the roles of the content farm, the federated services farm and the SQL farm; wherein the physical machines and the virtual machines are arranged in a highly available configuration;
  creating a backup for each database in the old farm while continuing to allow reads and writes to the database while the database is being backed up;
  copying each database in the old farm to the new farm; while continuing to allow reads and writes to the databases previously backed up in the old farm; wherein the old farm continues to process requests for the roles provided by the old farm;
  marking each database in the old farm as read only during a time period that each database is being copied to the new farm;
  automatically routing requests from the old farm to the new farm; and
  unprovisioning the old farm.

18. The system of claim 17, wherein deploying the new farm comprises automatically deploying the content farm first followed by deploying the federated services farm followed by deploying the database farm.

19. The system of claim 17, wherein provisioning the machines in the new farm comprises automatically starting a process to deploy the new farm within the network; wherein deploying the farm comprises provisioning the machines within the farm using virtual hard disk (VHD) images, and starting the machines.

20. The system of claim 17, further comprising determining when the upgrade is unsuccessful for a farm and when unsuccessful using routing requests to the databases in the old farm.

* * * * *